United States Patent
Okabayashi (10) Patent No.: US 8,453,810 B2
(45) Date of Patent: Jun. 4, 2013

(54) DAMPER DEVICE

(75) Inventor: Shunsuke Okabayashi, Yokohama (JP)

(73) Assignee: Nifco Inc., Yokohama-Shi (JP)

( * ) Notice: Subject to any disclaimer, the term of this patent is extended or adjusted under 35 U.S.C. 154(b) by 149 days.

(21) Appl. No.: 12/737,160

(22) PCT Filed: Jun. 15, 2009

(86) PCT No.: PCT/JP2009/060900
§ 371 (c)(1),
(2), (4) Date: Feb. 4, 2011

(87) PCT Pub. No.: WO2009/154183
PCT Pub. Date: Dec. 23, 2009

(65) Prior Publication Data
US 2011/0127129 A1  Jun. 2, 2011

(30) Foreign Application Priority Data
Jun. 18, 2008  (JP) ................... 2008-159455

(51) Int. Cl.
*F16F 9/34* (2006.01)
(52) U.S. Cl.
USPC ............ 188/322.15; 188/313; 188/316
(58) Field of Classification Search
USPC .......... 188/283, 284, 297, 312, 313, 314,
188/315, 316, 317, 322.13, 322.15; 267/124
See application file for complete search history.

(56) References Cited

U.S. PATENT DOCUMENTS

| 5,035,440 A | 7/1991 | Chappell |
| 5,884,734 A | 3/1999 | Hiramoto et al. |

FOREIGN PATENT DOCUMENTS

| DE | 4236150 A1 * | 4/1994 |
| JP | S54-127988 U | 9/1979 |
| JP | S56-147936 A | 11/1981 |
| JP | H01-307531 A | 12/1989 |
| JP | H02-129424 | 5/1990 |
| JP | H08-105482 | 4/1996 |
| JP | H08-239020 | 9/1996 |
| JP | 2000-170816 | 6/2000 |
| JP | 2005-291327 | 10/2005 |
| KR | 0141856 | 3/1998 |

* cited by examiner

*Primary Examiner* — Thomas J Williams
(74) *Attorney, Agent, or Firm* — Manabu Kanesaka (57) ABSTRACT

A damper device is provided with a cylinder body and a piston body, and provides braking for movement or relative movement of an object to be braked by attaching at least either the cylinder body or the piston body to the object to be braked. The piston body is provided with a seal ring for sealing between the piston body and the cylinder body. When a pressure difference between an inner space, located between the piston body and a deep inner section of the cylinder body, and the outside becomes a predetermined volume or above due to the movement or the relative movement of the piston body, one part of the seal ring is deflected and deformed so as to open a path for interconnecting the inner space and the outside.

10 Claims, 10 Drawing Sheets

DAMPER DEVICE

FIELD OF TECHNOLOGY

This invention relates to an improvement of a damper device which comprises a cylinder body and a piston body, and provides braking for movement or, relative movement of an object to be braked by attaching at least either the cylinder body or the piston body to the object to be braked.

BACKGROUND ART

As for a damper device, there is a damper device comprising a piston and a cylinder, for limiting a return speed of a pedal by the piston which is moved forward accompanied by returning to an original position of the pedal. Also, the damper device forms a taper face which gradually increases an internal diameter of the cylinder as moving toward a forward movement end position on a forward movement end position side of the piston. As the piston approaches the forward movement end position, airtightness between the piston and the cylinder declines, so that a braking force relative to the pedal gradually declines. (See Patent Document 1)

According to such damper device, in a case that a movement speed of the piston is relatively fast and a pressure difference between an inner space of the cylinder and the outside in the forward movement end position thereof is excessively increased, the damper device can prevent situations such that an excessive braking force is applied to the object to be braked such as the above-mentioned pedal, or moreover, such that the above-mentioned object to be braked is pulled back toward the position before the movement. However, in such damper device with the above-mentioned structure, on the forward movement end position side of the piston, the decline of the braking force always occurs regardless of the movement speed of the piston.

PRIOR ART DOCUMENT

Patent Document

Patent Document 1: Japanese Unexamined Patent Publication No. H07-165034

SUMMARY OF THE INVENTION

Problems to be Solved by the Invention

A main problem to be solved by the present invention is that in this kind of damper device, a braking force can be limited to less than a predetermined volume while always providing the braking force with a certain volume or above relative to the movement or the relative movement of the piston body.

Means for Solving the Problems

In order to achieve the above-mentioned object, in the present invention, from a first aspect, the damper device comprises the following structures (1) to (3).

(1) The damper device comprising a cylinder body and a piston body, and providing braking for movement or relative movement of an object to be braked by attaching at least either the cylinder body or the piston body to the object to be braked.

(2) A seal ring sealing between the piston body and the cylinder body is provided in the piston body.

(3) When a pressure difference between an inner space, located between the piston body and a deep inner section of the cylinder body, and the outside becomes a predetermined volume or above due to the movement or the relative movement of the piston body, one part of the seal ring is deflected and deformed so as to open a path for interconnecting this inner space and the outside.

Also, in order to achieve the above-mentioned object, in the present invention, from a second aspect, the damper device comprises the following structures (1) to (4).

(1) The damper device comprising the cylinder body and the piston body, and providing the braking for the movement or the relative movement of the object to be braked by attaching at least either the cylinder body or the piston body to the object to be braked.

(2) Until the pressure difference between the inner space, located between the piston body and the deep inner section of the cylinder body, and the outside becomes the predetermined volume due to the movement or the relative movement of the piston body, the braking in response to this pressure difference is provided.

(3) The seal ring sealing between the piston body and the cylinder body is provided in the piston body.

(4) When the pressure difference between the inner space, located between the piston body and the deep inner section of the cylinder body, and the outside becomes the predetermined volume or above due to the movement or the relative movement of the piston body, one part of the seal ring is deflected and deformed so as to open the path for interconnecting this inner space and the outside.

In such damper device, even in a case that the object to be braked is moved or relatively moved at a certain speed or above, and that a braking force, relative to the movement of the piston body which is moved or relatively moved accompanied by the above-mentioned movement of the object to be braked, excessively increases, at this time, such braking force can be controlled so as not to increase beyond an intended volume by interconnecting the above-mentioned inner space and the outside by opening the above-mentioned path, and by reducing the above-mentioned pressure difference to less than the predetermined volume. Thereby, situations, wherein the object to be braked is halted on the way of the movement, or moreover, wherein the object to be braked happens to be moved backward as soon as a forward movement operation is halted, can be prevented.

Effect of the Invention

In the damper device according to the present invention, the braking force can be limited to less than the predetermined volume while always providing the braking force with a certain volume or above relative to the movement or the relative movement of the piston body.

BEST MODES OF CARRYING OUT THE INVENTION

Hereinafter, with reference to FIGS. 1 to 11, best modes for implementing the present invention will be explained.

Figure 1:
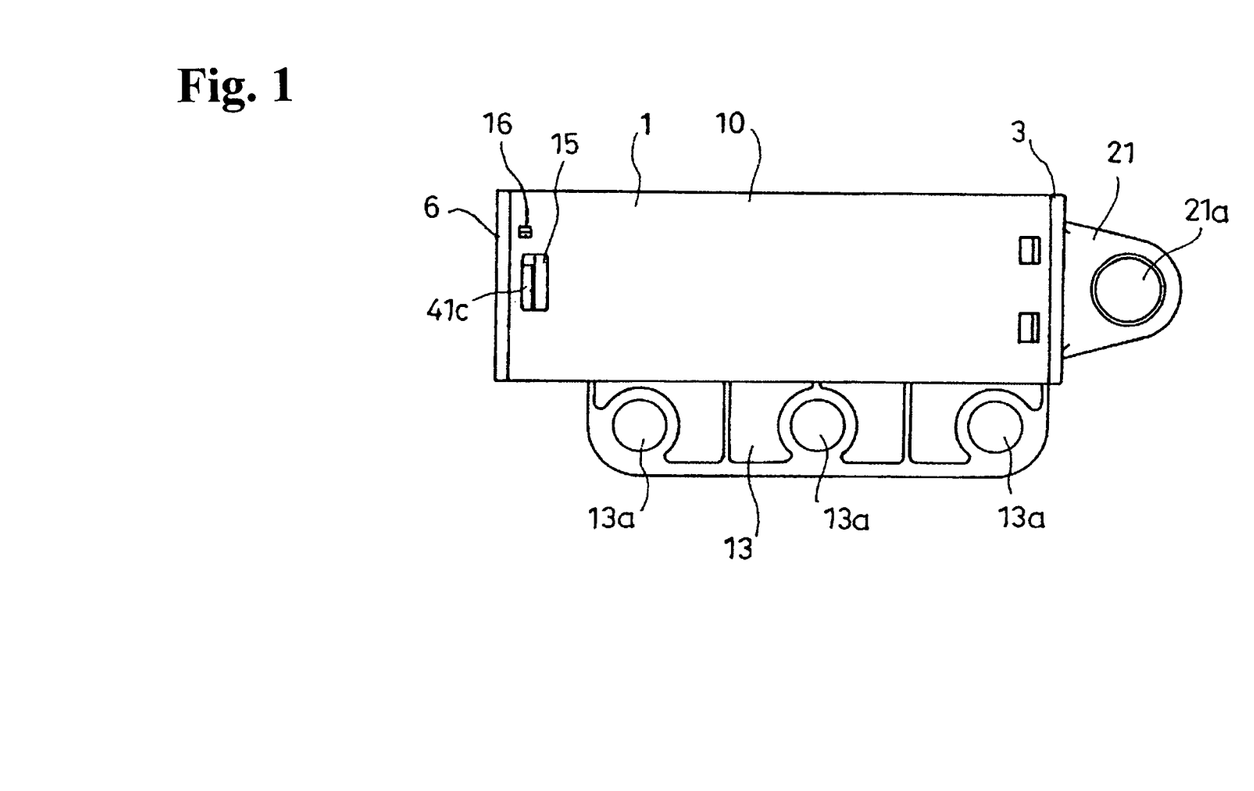
FIG. 1 is a side view of a damper device.
Figure 2:
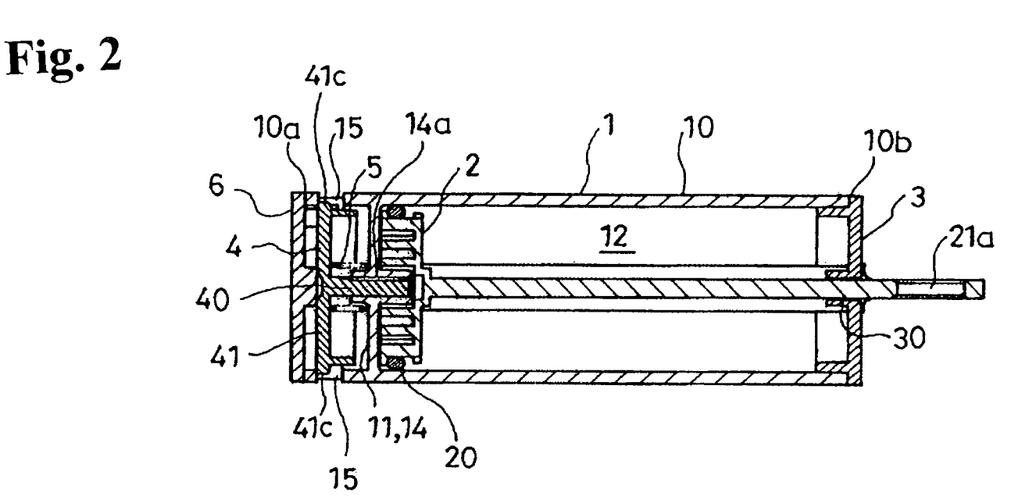
FIG. 2 is a cross sectional view of the same.
Figure 3:
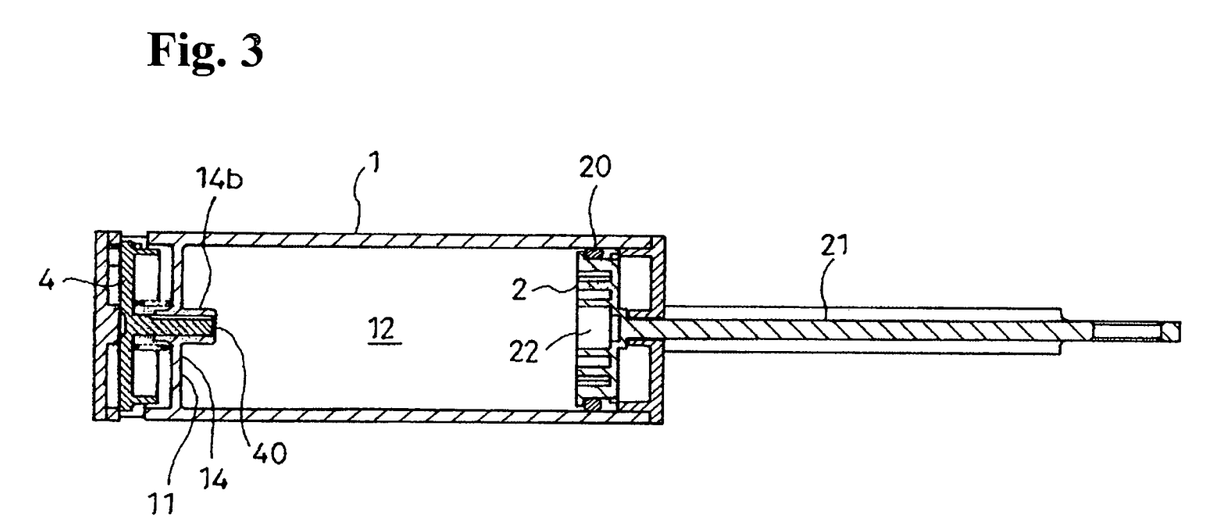
FIG. 3 is a cross sectional view of the same.
Figure 4:
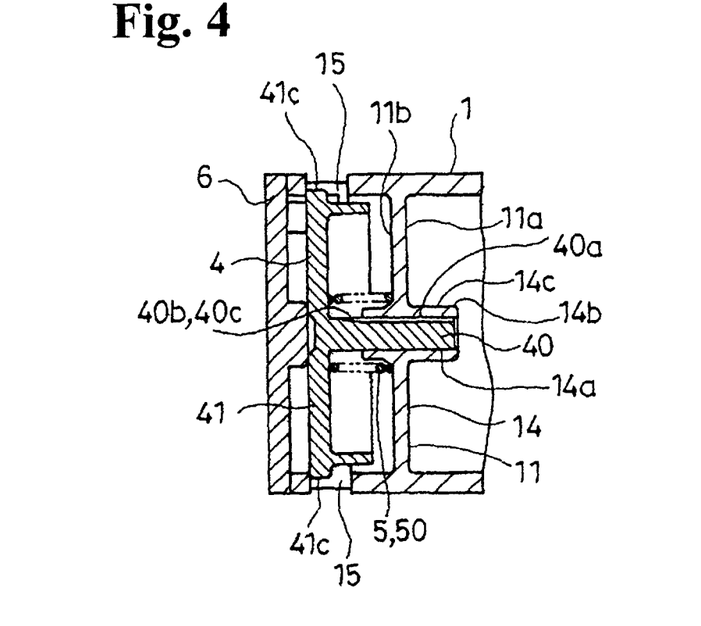
FIG. 4 is an enlarged sectional view of essential parts of the same.
Figure 5:
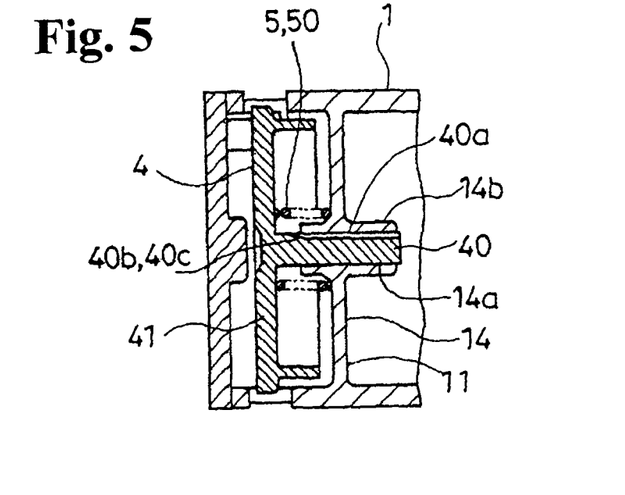
FIG. 5 is an enlarged sectional view of the essential parts of the same.
Figure 6:
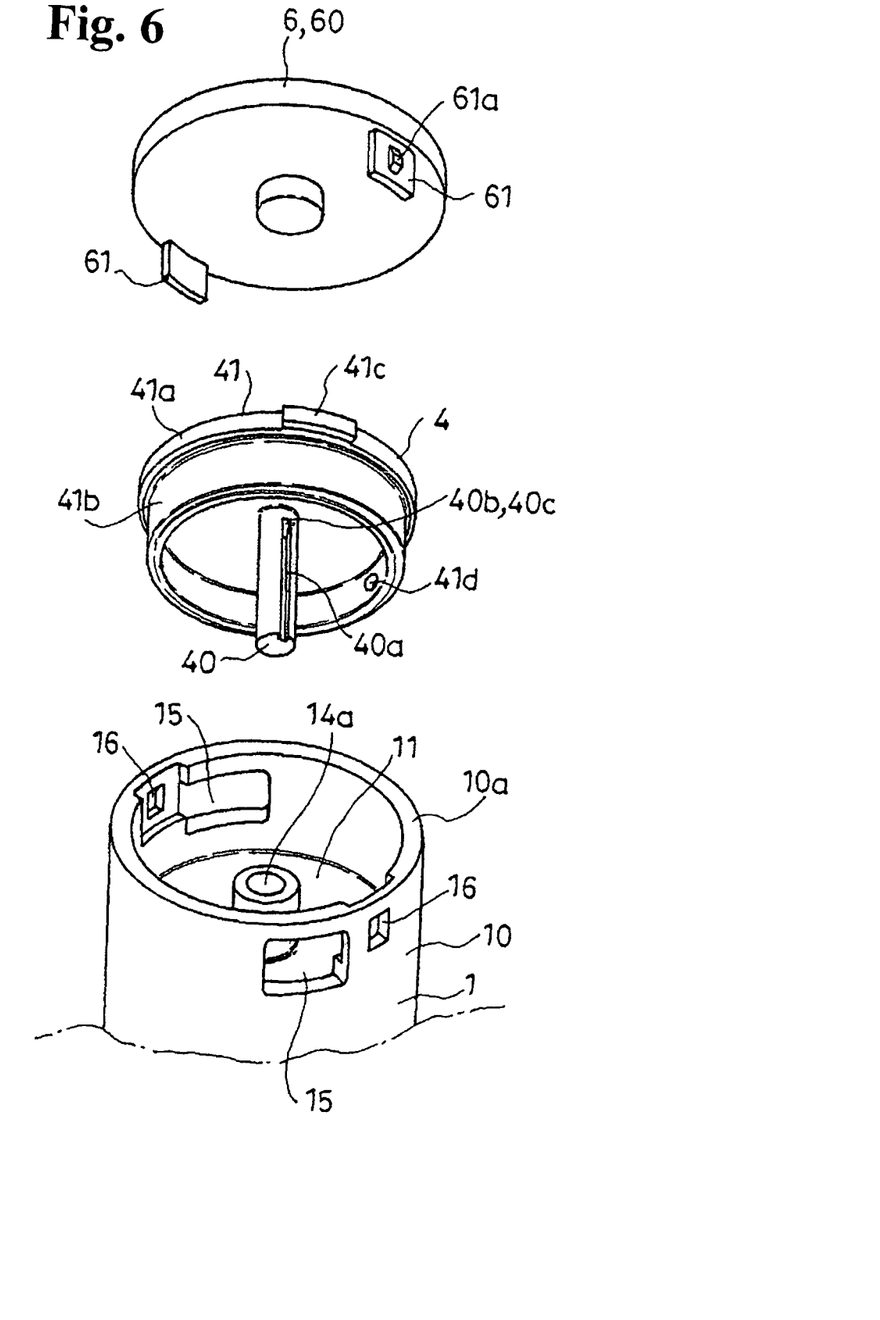
FIG. 6 is an exploded perspective view of the essential parts of the same.
Figure 7:
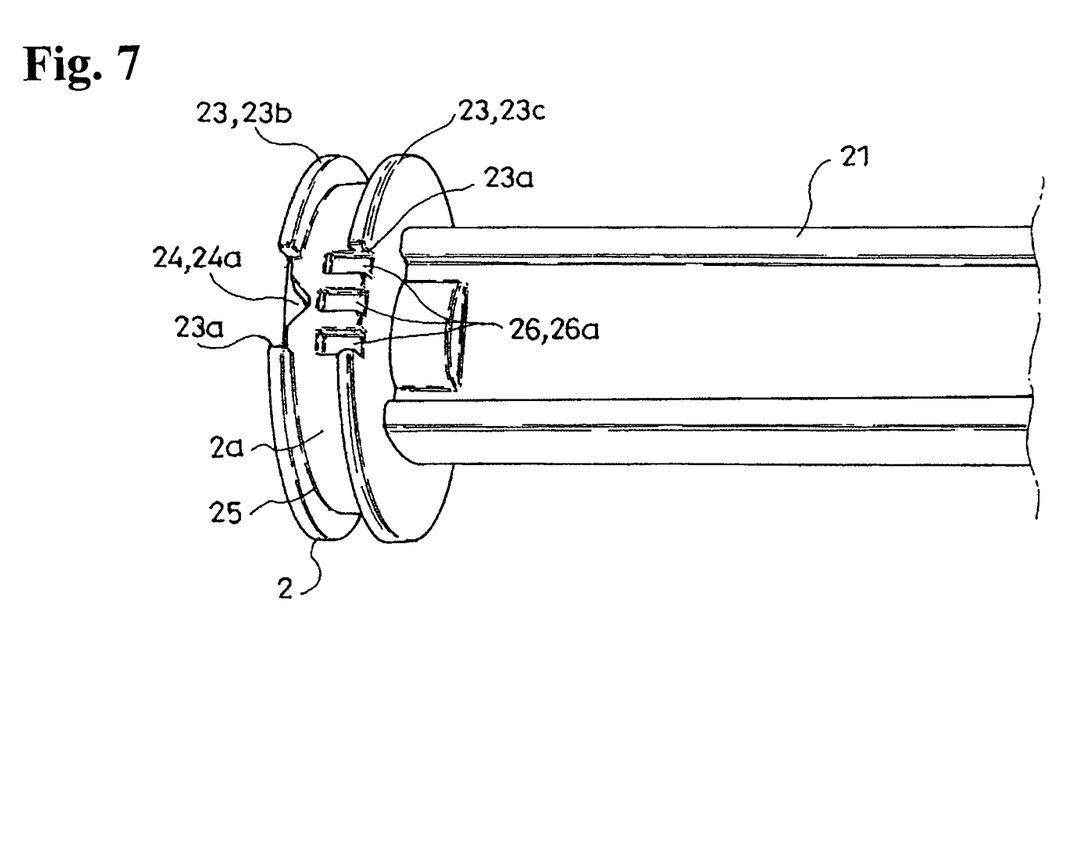
FIG. 7 is a perspective structural view of a piston body.
Figure 8:
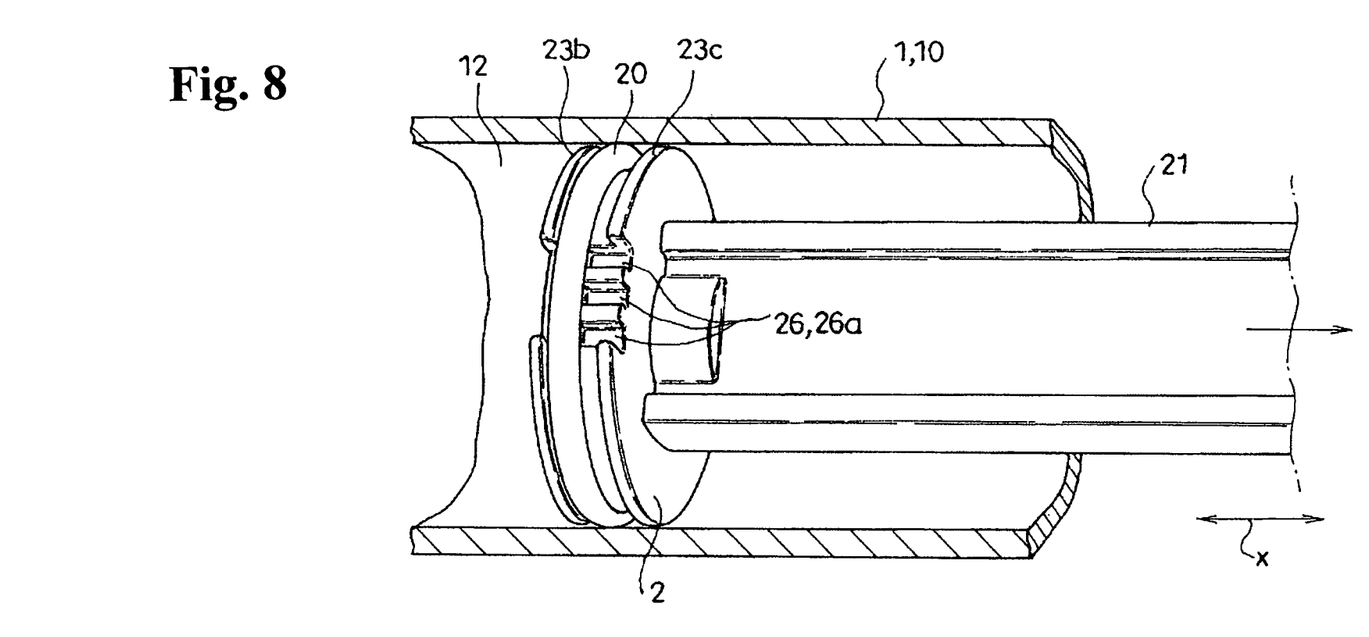
FIG. 8 is a broken perspective structural view of the essential parts of the damper device.
Figure 9:
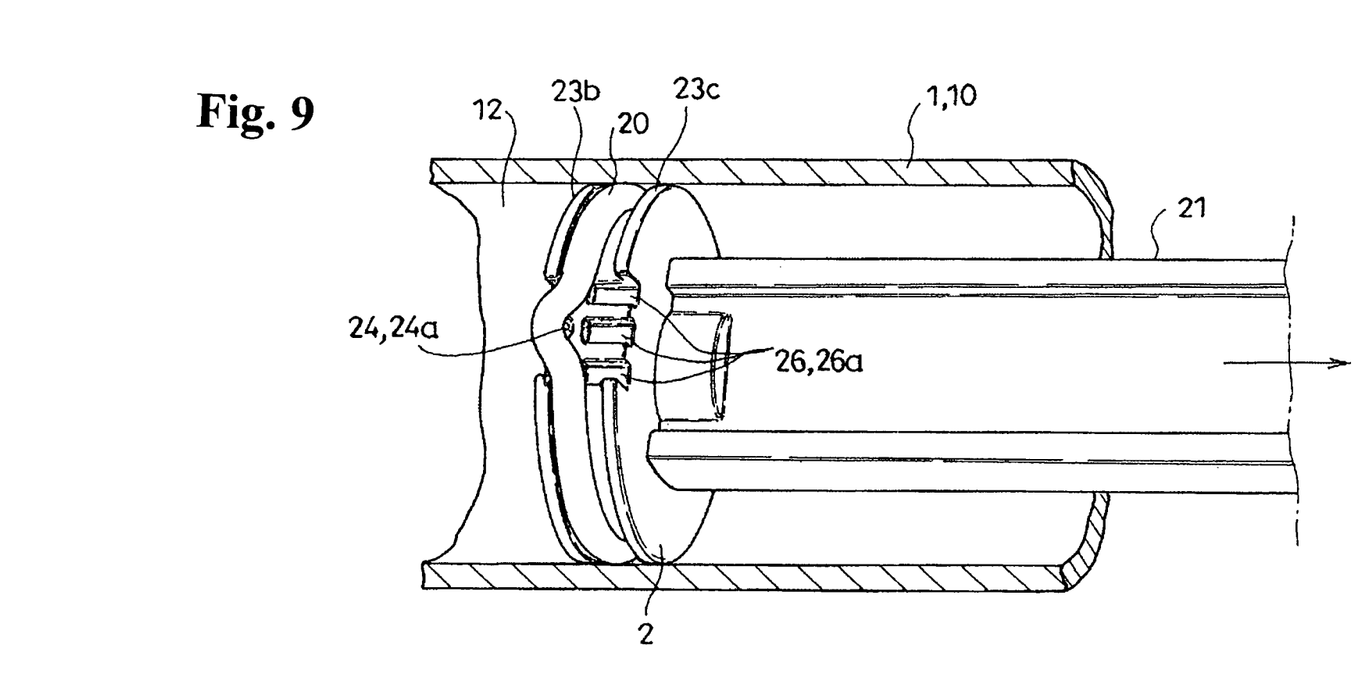
FIG. 9 is a broken perspective structural view of the essential parts of the damper device.
Figure 10:
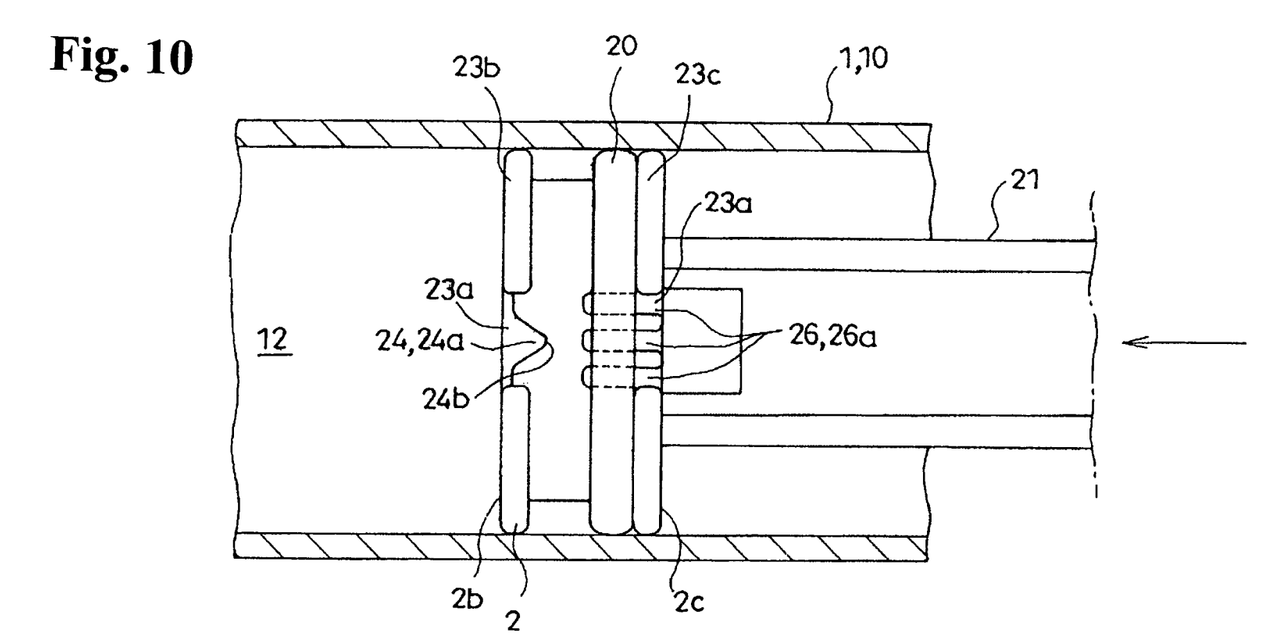
FIG. 10 is a sectional structural view of the essential parts of the damper device.
Figure 11:
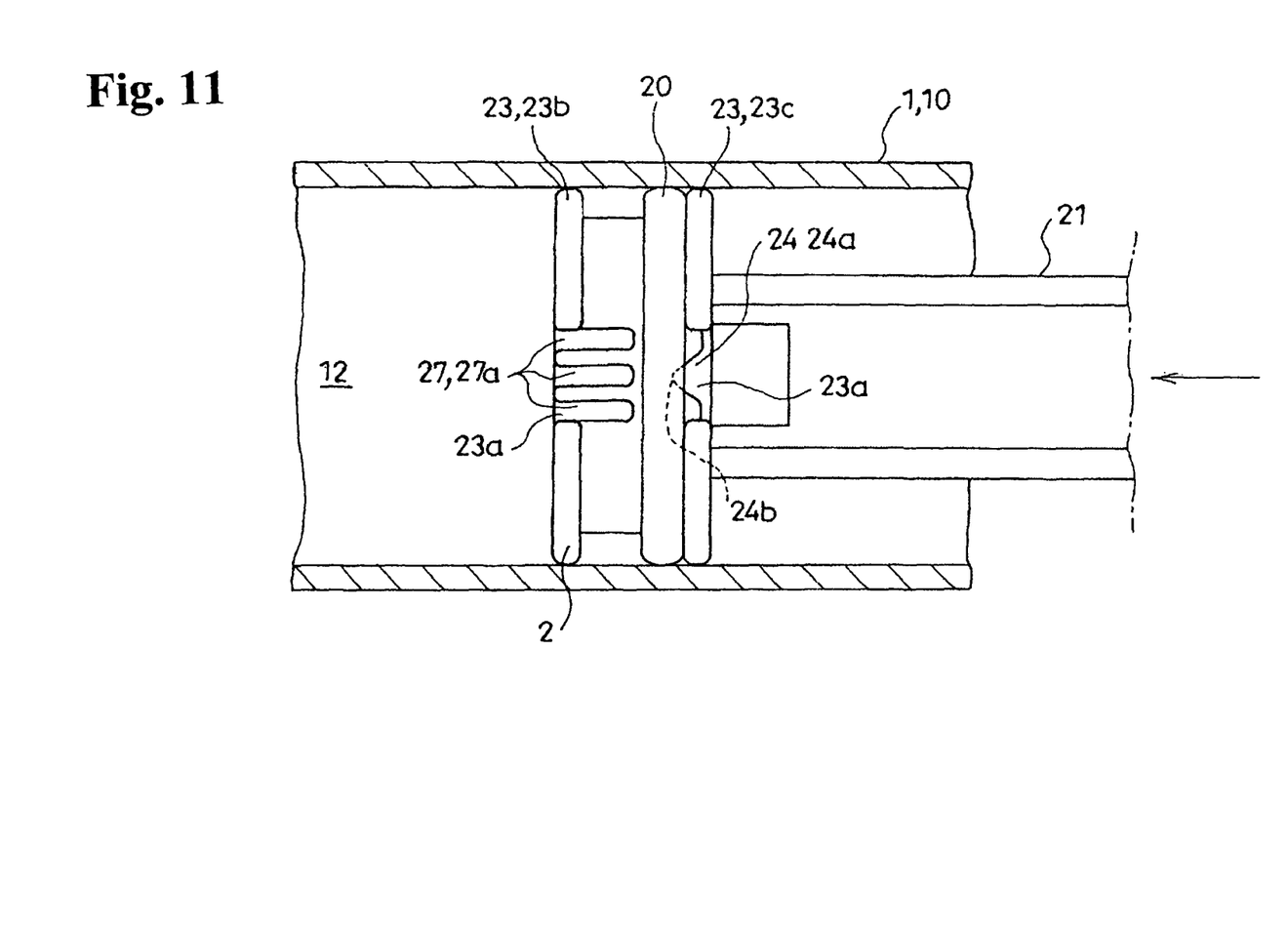
FIG. 11 is a sectional structural view of the essential parts showing a modified example of the damper device.

Incidentally, here, FIG. 1 shows a damper device structured by applying the present invention from a lateral side; FIGS. 2 and 3 show a cross-sectional view of the damper device; FIGS. 4 and 5 show the damper device by enlarging essential parts thereof; and FIG. 6 shows one part of components structuring the damper device in a separated state, respectively. FIGS. 1 and 2 show a condition when a piston body 2 is completely pushed in, i.e., completely moved forward, and FIG. 3 shows a condition when the piston body 2 is completely moved backward, respectively. Also, FIG. 7 shows a condition of the piston body 2 wherein a seal ring 20 is removed; FIG. 8 shows a condition when the piston body 2 is moved away from a deep inner section of a cylinder body 1; FIG. 9 shows a condition wherein a pressure difference between an inner space of a cylinder body and the outside becomes a predetermined volume or above when the piston body 2 is moved away as mentioned above; and FIG. 10 shows a condition when the piston body 2 is moved backward, respectively. Also, FIG. 11 shows an example in which the structure of the piston body 2 of the damper device shown in FIGS. 1 to 10 is modified.

The damper device according to an embodiment thereof comprises the cylinder body 1 and the piston body 2, and provides braking for movement or relative movement of an object to be braked which is not shown in the figures by attaching at least either the cylinder body 1 or the piston body 2 to the object to be braked.

For example, if the piston body 2 is attached to the object to be braked as a movable body, and the cylinder body 1 is attached to a fixing body which is not shown in the figures, the braking can be provided for the movement of the object to be braked through the piston body 2 in such a way as to move the piston body 2 by the movement of the object to be braked.

Also, if the piston body 2 is attached to the object to be braked as the movable body, and the cylinder body 1 is attached to the object to be braked as another movable body, the braking can be provided respectively for the movement of two objects to be braked in such a way as to move both the cylinder body 1 and the piston body 2 by the movement in a direction that the two objects to be braked approach each other, or a direction that the two objects to be braked start to depart from each other.

In the example shown in FIGS. 1 to 10, due to the pressure difference between an inner space 12 (a space between the above-mentioned deep inner section 14 and the piston body 2) of the cylinder body 1 and the outside which is produced when the piston body 2 is moved away from the deep inner section 14 of the cylinder body 1, the braking is provided for the movement wherein this piston body 2 is moved away. The piston body 2 can be moved away by an intake air toward the inner space 12 using an air-through hole 14a described hereinafter. In the example shown in FIGS. 1 to 10, when the piston body 2 moves backward, i.e., when the piston body 2 approaches the deep inner section 14 of the cylinder body 1, as mentioned hereinafter, between a pair of flanges 23, 23 of the piston body 2, the seal ring 20 moves toward just before the backward movement, and exhaust paths 26 are opened, so that this backward movement can be carried out with little resistance. At this time, the braking is not provided for the movement of the object to be braked which causes this backward movement. (FIG. 10) Also, in the example shown in FIGS. 1 to 10, due to a plug-like body 4 which slidably inserts an axis portion 40 into the above-mentioned air-through hole 14a described hereinafter, the piston body 2 is moved or relatively moved, so that until the pressure difference between the inner space 12 of the cylinder body 1 and the outside becomes the predetermined volume, the braking in response to this pressure difference is provided. Specifically, the faster a movement speed of the object to be braked becomes, the faster the piston body 2 moves or relatively moves, so that the above-mentioned pressure difference due to a change of a cubic volume of the inner space 12 increases. However, until this pressure difference becomes the predetermined volume, the larger this pressure difference becomes, the larger a size in which the axis portion 40 of the plug-like body 4 is inserted into the above-mentioned air-through hole 14a is made, so that by reducing an air intake amount from this air-through hole 14a, a resistance force relative to the movement wherein the piston body 2 moves away, i.e., the above-mentioned braking force increases further. Specifically, the example shown in FIGS. 1 to 10 is a damper device wherein the faster the speed of the movement or the relative movement of the object to be braked becomes, a braking force which exceeds a fundamental braking force is operated for this object to be braked, i.e., the damper device with a speed-response type.

On the other hand, in the example shown in FIG. 11, due to the pressure difference between the inner space 12 (the space between the above-mentioned deep inner section 14 and the piston body 2) of the cylinder body 1 and the outside which is produced when the piston body 2 approaches to the deep inner section 14 of the cylinder body 1, the braking is provided for the approaching movement of this piston body 2. This approaching movement is allowed by exhaust from the inner space 12 to the outside through an air-through portion which is not shown in the figure. In the example shown in FIG. 11, when the piston body 2 moves backward, i.e., when the piston body 2 moves away from the deep inner section 14 of the cylinder body 1, the seal ring 20 moves toward just before the backward movement between the pair of flanges 23, 23 of the piston body 2, and intake paths 27 described hereinafter are opened, so that this backward movement is carried out with little resistance. At this time, the braking is not provided for the movement of the object to be braked which causes this backward movement.

Then, both damper devices according to the present embodiments allow one part of the seal ring 20 to be deflected and deformed as mentioned hereinafter when the pressure difference between the inner space 12, which is between the piston body 2 and the deep inner section 14 of the cylinder body 1, and the outside becomes the predetermined volume or above due to the movement or the relative movement of the piston body 2, so that a path 24 interconnecting this inner space 12 and the outside is allowed to be open.

Thereby, in the damper device according to the present embodiment, even in a case that the object to be braked is moved or relatively moved at a certain speed or above, and that a braking force, relative to the movement of the piston body 2 which is moved or relatively moved accompanied by the above-mentioned movement of the object to be braked, excessively grows, at this time, such braking force can be controlled so as not to grow beyond an intended volume by interconnecting the above-mentioned inner space 12 and the outside by opening the above-mentioned path 24, and by reducing the above-mentioned pressure difference to less than the predetermined volume. Thereby, situations, wherein the object to be braked is halted on the way of the movement, or moreover, wherein the object to be braked happens to be moved backward as soon as a forward movement operation is halted, can be prevented.

Example Shown in FIGS. 1 to 10

In the example shown in FIGS. 1 to 10, the cylinder body 1 is structured so as to divide the inside of a cylindrical body 10, forming a cylindrical shape wherein both cylindrical ends 10a, 10b are opened, into two by a divider plate 11. The divider plate 11 is provided in a position slanted to one cylindrical end 10a of the cylindrical body 10, and the in-between of this divider plate 11 and the other cylindrical end 10b as the deep inner section of the cylindrical body 10, functions as the inner space 12 of the cylinder body 1. In the illustrated example, outside the cylinder body 1, a tongue piece portion 13 elongated along a cylindrical axis direction of this cylinder body 1 is formed. Also, in this tongue piece portion 13, a fixing hole 13a of the cylinder body 1 is formed.

The piston body 2 is structured as a discoid body comprising an external diameter approximately equal to an internal diameter of such cylinder body 1. The seal ring 20 is fitted into an outer circumference of the piston body 2, and an outer circumferential portion of the piston body 2 and an inner circumferential portion of the cylinder body 1 are air-tightly sealed by this seal ring 20.

In the illustrated example, such seal ring 20 is formed in an annular shape, and structured by rubber or a rubber-like elastic material. Such seal ring 20 is housed between the flanges 23 respectively formed in the piston body 2 in two portions leaving a space in a movement direction x of the piston body 2. Such flanges 23 are structured so as to project in a direction approximately orthogonal to an outer circumferential face which is in a thickness direction of the piston body 2 forming a discoid shape from this outer circumferential face, and also so as to form a rib shape continuing along a circumferential direction of the piston body 2. The external diameter of the piston body 2 is slightly smaller than the internal diameter of the cylinder body 1 at formation portions of the flanges 23. On the other hand, the external diameter of the seal ring 20 is slightly larger than the internal diameter of the cylinder body 1. Also, the internal diameter of the seal ring 20 is slightly smaller than the external diameter of the piston body 2 located between the two portions of the flanges 23. Thereby, in the portion where the seal ring 20 is located, the cylinder body 1 and the piston body 2 are sealed in an air-tight condition. Also, the space between the two portions of the flanges 23, 23 is larger than the width of the seal ring 20, and due to the movement of the piston body 2, the seal ring 20 moves in the movement direction x of the piston body 2 in between the two portions of the flanges 23, 23.

In the illustrated example, one part thereof of both such two portions of the flanges 23 is notched. In the illustrated example, one end of one notch portion 23a and one end of the other notch portion 23a of such two portions of the flanges 23, are located on an imaginary straight line along the movement direction x of the piston body 2. Also, the other end of one notch portion 23a and the other end of the other notch portion 23a of such two portions of the flanges 23, are located on an imaginary straight line along the movement direction x of the piston body 2. As for the notch portions 23a of the two portions of the flanges 23, in the movement direction x of the piston body 2, the notch portion 23a of the other flange 23 is formed behind the notch portion 23a of one flange 23 with the same width.

Also, such notch portions 23a have a width allowing one part of the seal ring 20 to be inserted while being deformed when the pressure difference between the inner space 12 of the cylinder body 1 and the outside becomes the predetermined volume or above.

In the example shown in FIGS. 1 to 10, a depressed portion 24a which becomes the above-mentioned path 24 is formed in the notch portion 23a of the flange 23 (hereinafter, the flanges 23 is called a deep side flange 23b, and the rest of the flanges 23 is called an outside flange 23c) which is located on a side facing the inner space 12 of the cylinder body 1 in the piston body 2. Also, such depressed portion 24a is structured such that a width in a direction orthogonal to the movement direction x of the piston body 2 is gradually widened as the depressed portion 24a moves away from a seal ring 20 side, i.e., a holding portion 25 of the seal ring 20 formed between the two portions of the flanges 23. In the illustrated example, such depressed portion 24a is structured so as to be engraved on an external circumferential face 2a of the piston body 2 and have the outline of an approximately triangle wherein the top portion 24b faces toward the outside and the base becomes a marginal portion of an inner face facing the inner space 12 of the piston body 2. In this example, when the piston body 2 is moved away as mentioned above, the seal ring 20 is pressed against the above-mentioned deep side flange 23b (FIG. 8); however, the above-mentioned depressed portion 24a is formed so as to place the top portion 24b thereof on an inner end face 2b side of the piston body 2 dividing the above-mentioned inner space 12 by a contact portion between the seal ring 20 in the above-mentioned pressed position and the external circumferential face 2a of the piston body 2. Thereby, until the pressure difference between the inner space 12 of the cylinder body 1 and the outside becomes the predetermined volume, the path 24 can be closed by the seal ring 20. Also, when this pressure difference becomes the predetermined volume or above, due to this pressure difference, in this example, the path 24 can be opened by deflecting one part of the seal ring 20 from the outside which has a high pressure and inserting the part into the notch portions 23a. (FIG. 9) In this example, since the path 24 gradually increases the width as moving toward the inner space 12 as mentioned above, due to the seal ring 20 which increases an insert amount into the notch portions 23a as the above-mentioned pressure difference becomes larger, the greater this pressure difference becomes, the width of the path 24 to be opened is widened, so that the pressure difference can be decreased in a short period of time. Also, in the example shown in FIGS. 1 to 10, when the piston body 2 is moved backward, the seal ring 20 is pressed against the above-mentioned outside flange 23c (FIG. 10); however, in the notch portions 23a notching this outside flange 23c, triple grooves 26a extending along the movement direction x of the piston body 2 are formed on the external circumferential face 2a of the piston body 2. The triple grooves 26a open one end of the grooves in an outside end face 2c of the piston body 2, and also position the other end of the grooves on an inner end face 2b side of the piston body 2 rather than the contact portion between the seal ring 20 which is in the position pressed against the deep side flange 23b and the external circumferential face 2a of the piston body 2. In this example, if the piston body 2 is moved backward and the seal ring 20 is pressed against the outside flange 23c, such contact portion is moved toward the outside end face 2c of the piston body 2 rather than the other end of the grooves of the triple grooves 26a, and the triple grooves 26a are opened, so that the exhaust is carried out from the inner space 12 through the triple grooves 26a. Specifically, in this example, such triple grooves 26a function as the above-mentioned exhaust paths 26. (FIG. 10)

One end of a piston rod 21 forming a slender plate shape is integrally connected to the side wherein the piston body 2 faces the other cylindrical end 10b of the cylinder body 1. The other cylindrical end 10b of the cylinder body 1 is blocked by a lid body 3 comprising a through-hole 30 of the piston rod 21. The piston rod 21 is projected to the outside of the cylinder body 1 through the through-hole 30 of this lid body 3. Also, a fixing hole 21a for the object to be braked is formed in the projecting end of the piston rod 21.

The air-through hole 14a is fanned in the deep inner section 14 facing the piston body 2 in the cylinder body 1, in the illustrated example, in the above-mentioned divider plate 11. In the illustrated example, such air-through hole 14a is provided in an approximately center portion of the divider plate 11, and is formed in such divider plate 11 by a tubular body 14b comprising a portion projecting from the inside of the divider plate 11 which faces the piston body 2, and a portion projecting from the outside of the divider plate 11.

The cylinder body 1 also comprises the plug-like body 4 comprising the axis portion 40 which is movably inserted into this air-through hole 14a, and urging means 5 of this plug-like body 4.

The plug-like body 4 includes a head portion 41 integrally comprising the above-mentioned axis portion 40. In the illustrated example, such head portion 41 is structured by forming a circling rising portion 41b in a marginal portion thereof on one face side of a circular plate body 41a comprising an external diameter approximately equal to an internal diameter of the cylindrical body 10 structuring the cylinder body 1. The axis portion 40 is provided in such a way that one end of the axis is integrally connected to an approximately center portion of one face side of this head portion 41 and that the axis portion 40 projects from this head portion 41 in a direction orthogonal to one face of this head portion 41.

In the illustrated example, latched portions 15 comprising a window hole shape are formed in this cylindrical body 10 on the outside of the above-mentioned divider plate 11 which divides the cylindrical body 10 structuring the cylinder body 1. Also, latching portions 41c forming a claw shape which are inserted into the above-mentioned latched portions 15 are provided in the head portion 41 of the above-mentioned plug-like body 4. The latched portions 15 are respectively formed on both sides of a diametrical direction of the cylindrical body 10, and the latching portions 41c are also formed respectively on both sides of the diametrical direction of the above-mentioned head portion 41 corresponding to the latched portions 15. The latching portions 41c are structured so as to form a rib shape elongated along a marginal portion of the circular plate body 41a structuring the head portion 41. The size between projecting ends of a pair of latching portions 41c, 41c is slightly larger than the internal diameter of the cylindrical body 10 structuring the cylinder body 1. On the other hand, the latched portions 15 are structured as a through-hole with an approximately rectangular shape elongated along a circumferential direction of the cylindrical body 10. The length of the latched portions 15 is structured so as to be longer than the length of the latching portions 41c.

Thereby, in this example, by inserting the plug-like body 4 into the cylindrical body 10 from the outside of the divider plate 11 of the cylindrical body 10 structuring the cylinder body 1 in such a way that the axis portion 40 is inserted into the air-through hole 14a, the latching portions 41c are latched in the latched portions 15. Accordingly, a state wherein the axis portion 40 of the plug-like body 4 is inserted into the air-through hole 14a, can be maintained.

In the illustrated example, the cylindrical body 10 structuring the cylinder body 1 is structured by plastic molding. When the plug-like body 4 is inserted into the cylindrical body 10 as mentioned above, mainly, the side of this cylindrical body is elastically deformed once by the latching portions 41c; and the latching portions 41c are latched in the latched portions 15 by elastic returning at the position where the latching portions 41c are inserted into the latched portions 15. The size of the latched portions 15 in the cylindrical axis direction of the cylinder body 1 is slightly larger than the size of the latching portions 41c in this direction. Thus, the plug-like body 4 combined with the cylinder body 1 can move in the cylindrical axis direction of the cylinder body 1 within a certain range.

In the illustrated example, the urging means 5 is provided in such a way as to be wound around the outside between the axis portion 40 of the above-mentioned plug-like body 4 and a projecting portion which is positioned on the outside of the divider plate 11 in the tubular body 14b structuring the air-through hole 14a. The urging means 5 is structured by a compression coil spring 50 wherein one end of the spring is pressed against the head portion 41 of the plug-like body 4 and the other end of the spring is pressed against the outside of the divider plate 11. Due to this spring 50, the plug-like body combined with the cylinder body 1 as mentioned above is positioned in such a way as to press the latching portion 41c against a window border of the latched portion 15 positioned on one cylindrical end 10a side of the cylindrical body 10.

Also, in this embodiment, in a state wherein the piston body 2 is not allowed to move, due to the above-mentioned urging means 5, a reduced diameter portion 40b of the axis portion 40 of the plug-like body 4 described hereinafter is positioned on the outward of the air-through hole 14a of the cylinder body 1, i.e., on the outside of the outer end of the tubular body 14b. (FIG. 4)

The axis portion 40 of the above-mentioned plug-like body 4 comprises a groove 40a along a sliding direction thereof starting from an axis end positioned on an inner space 12 side of the cylinder body 1 in this axis portion 40. On a terminal side of this groove 40a, the reduced diameter portion 40b, which reduces both the depth and the width of this groove or either the depth or the width of this groove, is formed.

Then, due to the urging of the above-mentioned urging means 5, the reduced diameter portion 40b of the axis portion 40 of the plug-like body 4 is positioned on the outward of the air-through hole 14a of the cylinder body 1. Also, due to a pressure change caused by the movement or the relative movement of the piston body 2 in a direction of moving away from the deep inner section 14 of the cylinder body 1, the reduced diameter portion 40b of the axis portion 40 of the plug-like body 4 is inserted into the air-through hole 14a against the above-mentioned urging.

If the piston body 2 is moved or relatively moved in a direction of approaching to the deep inner section 14 of the cylinder body 1 due to the movement or the relative movement of the object to be braked, the air inside the cylinder body 1 is exhausted by passing through between the groove of the axis portion 40 of the plug-like body 4 and an inner face of the air-through hole 14a.

In the illustrated example, a through-hole 41d is formed in the circling rising portion 41b of the plug-like body 4, and the air exhausted from the air-through hole 14a is sent to the outward through this through-hole 41d or the latched portions 15.

If the piston body 2 is moved or relatively moved in the direction of moving away from the deep inner section 14 of the cylinder body 1 due to the movement or the relative movement of the object to be braked, the inside of cylinder body 1 becomes negative pressure, so that a force is applied to the axis portion 40 of the plug-like body 4 in a direction of being pulled in a movement direction of the piston body 2, and the plug-like body 4 is moved against the urging of the urging means 5. If the plug-like body 4 is moved as mentioned above, one part of the above-mentioned reduced diameter portion 40b is inserted into the air-through hole 14a, so that it becomes difficult for the air to be taken into the cylinder, and the braking is operated for the movement or the relative movement of the piston body 2. Thereby, the braking can be operated greatly for the movement or the relative movement of the object to be braked.

In the illustrated example, a depressed portion 22, wherein an inner end 14c of the tubular body 14b structuring the air-through hole 14a can be housed, is formed on a side facing the deep inner section 14 of the cylinder body 1 in the piston body 2. The position where the inner end 14c of the tubular body 14b is bumped into a bottom face of this depressed portion 22 is the position where the piston body 2 is completely moved forward. If the piston body 2 is moved away as mentioned above, i.e., moved backward, the plug-like body 4 is moved in such a way that the latching portion 41c is approached to the window border on the other cylindrical end 10b side of the cylindrical body 10 in the latched portion 15, so that the above-mentioned spring 50 is compressed. (FIG. 5) If the backward movement of the piston body 2 halts, due to an urging force of the spring 50, the plug-like body 4 is pushed back, and the reduced diameter portion 40b is positioned again on the outward of the air-through hole 14a. (FIG. 4)

In the illustrated example, the above-mentioned reduced diameter portion 40b is structured by forming a groove bottom of the terminal side of the groove of the axis portion 40 of the plug-like body 4 in a tapered face shape 40c. Thereby, the greater an insert amount into the air-through hole 14a of the reduced diameter portion 40b becomes, the larger a resistance relative to the movement of the piston body 2 becomes. In a case that there is a clearance accordingly between an external circumferential face of the axis portion 40 of the plug-like body 4 and an internal circumferential face of the air-through hole 14a, due to this clearance, the air is allowed to be inserted into the inner space 12 of the cylinder body 1. Accordingly, in this case, the reduced diameter portion 40b can be completely inserted into the air-through hole 14a.

Also, in the illustrated example, the damper device comprises a cover 6 covering the cylindrical end which is located on the outside of the divider plate 11 in the cylindrical body 10 structuring the cylinder body 1 in a state wherein the head portion 41 of the plug-like body 4 is housed between the cylindrical end and this divider plate 11.

Such cover 6 includes a discoid body 60 which is approximately equal to an external diameter of the cylindrical body 10 structuring the cylinder body 1. Also, the cover 6 comprises latching arms 61 projecting from marginal portions thereof on one face side of this discoid body 60. Such latching arms 61 are respectively provided on both sides of a diametrical direction of the discoid body. On the outside of a fore-end portion of the latching arms 61, small projections 61 are formed, and by inserting such latching arms 61 into this cylindrical body 10 from one end side of the cylinder of the cylindrical body 10, the small projections 61 are latched in latching windows 16 formed on lateral sides of the above-mentioned latched portions 15 of the cylindrical body 10 by recoiling.

Thereby, in the illustrated example, a situation such that the reduced diameter portion 40b happens to be unexpectedly inserted into the air-through hole 14a by such that a member disposed around an installed portion of the damper device and the like are pressed against the plug-like body 4 and the like, can be prevented.

Example Shown in FIG. 11

Contrary to the example shown in FIGS. 1 to 10, in the example shown in FIG. 11, the depressed portion 24a which becomes the above-mentioned path 24 is formed in the notch portion 23a of the outside flange 23c, and triple grooves 27a are formed in the notch portion 23a of the deep side flange 23b. The triple grooves 27a function as the intake paths 27. Even in this example, until the pressure difference between the inner space 12 of the cylinder body 1 and the outside becomes the predetermined volume, the path 24 can be closed by the seal ring 20. Also, when this pressure difference becomes the predetermined volume or above, due to this pressure difference, in this example, one part of the seal ring 20 is deflected from the inner space 12 side which has a high pressure, and inserted into the notch portion 23a, so that the path 24 can be opened.

OTHERS

In the example explained above, although fluid is described as the air (gas), even in a case that the fluid is liquid, the above-explained example functions in the same fashion. For example, in such a case that the object to be braked is used by being soaked in the liquid, or that the cylinder body 1 is further housed in an outside case which is not shown in the figures so as to fill the inside of this outside case with the liquid, and the like, the braking can be provided for the object to be braked by using the liquid.

Incidentally, all contents of the specification, claims, drawings, and abstract of Japanese Patent Application No. 2008-159455 filed on Jun. 18, 2008 are cited in their entirety herein and are incorporated as a disclosure of the specification of the present invention.

What is claimed is:

1. A damper device adapted to attach to an object for damping a movement or relative movement thereof, comprising:
   a cylinder body; and
   a piston body including a seal ring for sealing between the piston body and the cylinder body, and first and second flanges having a space therebetween in a movement direction of the piston body and housing the seal ring,
   wherein the first flange has a notch portion to receive one part of the seal ring deflecting in response to a movement of the piston body, and the second flange has an exhaust path for communicating the space with an inside of the cylinder body, and
   the seal ring is arranged such that when the seal ring moves toward a notch portion side upon movement of the piston body, a braking force is applied, and when the seal ring moves toward an exhaust path side, the inner space is released, and
   when a pressure difference between the inner space, located between the piston body and a deep inner section of the cylinder body, and an outside becomes a predetermined volume or above due to the movement or the relative movement of the piston body, the one part of the seal ring is deflected and deformed so as to open a path for interconnecting the inner space and the outside.

2. A damper device according to claim 1, wherein a depressed portion which becomes the path is formed in the notch portion of the flange.

3. A damper device according to claim 2, wherein the depressed portion is structured such that a width in a direction orthogonal to the movement direction of the piston body is gradually widened as the depressed portion moves away from a seal ring side.

4. A damper device according to claim 1, wherein the second flange has another notch portion aligned in an axial direction with the notch portion of the first flange, and the exhaust path is formed in the another notch portion of the second flange.

5. A damper device according to claim 4, wherein the exhaust path is a groove extending beyond the second flange towards the first flange without extending to the first flange and formed on an external circumferential face of the piston body.

6. A damper device according to claim 1, wherein the exhaust path is a plurality of grooves extending beyond the second flange towards the first flange without extending to the first flange and formed on an external circumferential face of the piston body.

7. A damper device adapted to attach to an object for damping a movement or relative movement thereof, comprising:
   a cylinder body; and
   a piston body including a seal ring for sealing between the piston body and the cylinder body, and first and second flanges having a space therebetween in a movement direction of the piston body and housing the seal ring,
   wherein the first flange has a notch portion to receive one part of the seal ring deflecting in response to a movement of the piston body, and the second flange has an exhaust path for communicating the space with an inside of the cylinder body, and
   the seal ring is arranged such that when the seal ring moves toward a notch portion side, a braking force is applied, and when the seal ring moves toward an exhaust path side, the inner space is released,
   wherein until a pressure difference between the inner space, located between the piston body and a deep inner section of the cylinder body, and an outside becomes a predetermined volume due to the movement or the relative movement of the piston body, the braking force in response to the pressure difference is provided;
   when the pressure difference between the inner space, located between the piston body and the deep inner section of the cylinder body, and the outside becomes the predetermined volume or above due to the movement or the relative movement of the piston body, the one part of the seal ring is deflected and deformed so as to open a path for interconnecting the inner space and the outside.

8. A damper device according to claim 7, wherein the second flange has another notch portion aligned in an axial direction with the notch portion of the first flange, and the exhaust path is formed in the another notch portion of the second flange.

9. A damper device according to claim 8, wherein the exhaust path is a groove extending beyond the second flange towards the first flange without extending to the first flange and formed on an external circumferential face of the piston body.

10. A damper device according to claim 7, wherein the exhaust path is a plurality of grooves extending beyond the second flange towards the first flange without extending to the first flange and formed on an external circumferential face of the piston body.

* * * * *